United States Patent

Harvey

[15] 3,673,939
[45] July 4, 1972

[54] PHOTOGRAPHIC APPARATUS

[72] Inventor: Donald M. Harvey, Webster, N.Y.
[73] Assignee: Eastman Kodak Company, Rochester, N.Y.
[22] Filed: Oct. 2, 1970
[21] Appl. No.: 77,511

[52] U.S. Cl. ..................................................95/13, 95/19
[51] Int. Cl. ..................................................G03b 17/52
[58] Field of Search .................................95/13, 19, 21, 22

[56] References Cited

UNITED STATES PATENTS

| | | | |
|---|---|---|---|
| 2,966,103 | 12/1960 | Erikson | 95/13 |
| 2,873,658 | 2/1959 | Land | 95/13 |
| 2,903,951 | 9/1959 | Land | 95/19 |
| 3,152,529 | 10/1964 | Erlichman | 95/13 |
| 1,140,877 | 5/1915 | Cocanari | 95/22 |
| 3,134,313 | 5/1964 | Gold et al. | 95/13 |
| 3,200,725 | 8/1965 | Linder | 95/13 |

*Primary Examiner*—Samuel S. Matthews
*Assistant Examiner*—Fred L. Braun
*Attorney*—Robert W. Hampton and William C. Dixon, III

[57] ABSTRACT

An improved camera and cartridge for use with an assemblage of self-processing film units interconnected by an elongate, relatively flexible, unit-transporting web movable with the cartridge, each film unit including a pair of preregistered, superposed, relatively stiff, substantially flat sheets separably coupled to the web. The camera is provided with a chamber for receiving the cartridge, a spring-loaded member for applying pressure at a predetermined location in the cartridge, a mechanism for advancing the web inside the cartridge, and an exit opening at one end of the camera. The cartridge has a chamber for containing the assemblage, an exit slot at one end of the cartridge in alignment with the exit opening of the camera, through which the pairs of preregistered sheets of the film units are successively transportable along a substantially straight path as the web is moved within the cartridge in response to operation of the web advancing mechanism of the camera, a pressure-bearing and web-guiding member near the exit slot for supporting the web and film units against pressure applied by the spring-loaded member of the camera and for guiding the web along an arcuate path divergent from the straight path of the preregistered sheets to effect separation of the preregistered sheets from the web as the sheets are successively transported along the straight path, and a web take-up device at the opposite end of the cartridge which is rotatable by the web advancing mechanism of the camera for receiving and storing the web and processing waste material from the pressure-bearing and web-guiding member after the pairs of preregistered sheets have been separated from the web.

22 Claims, 11 Drawing Figures

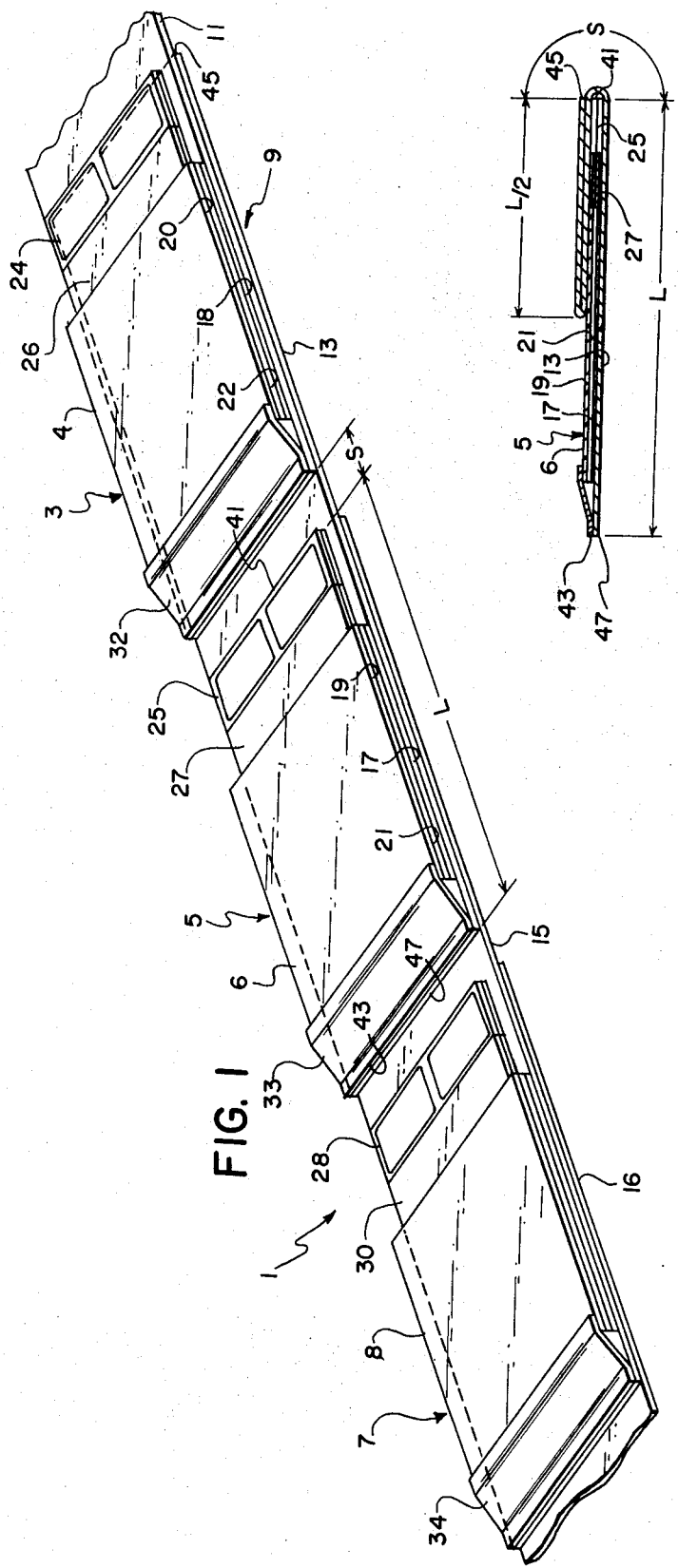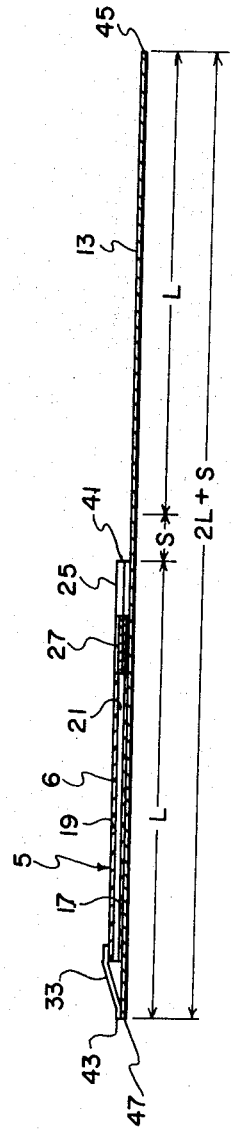

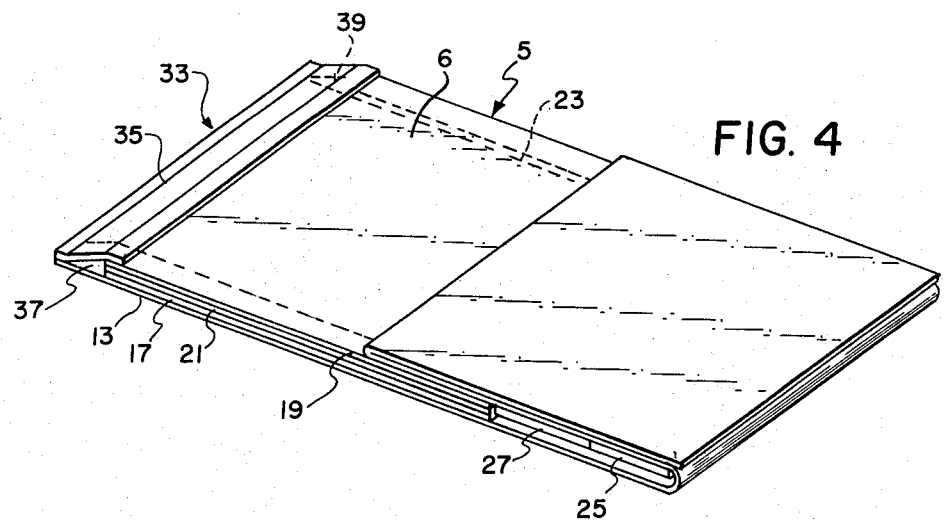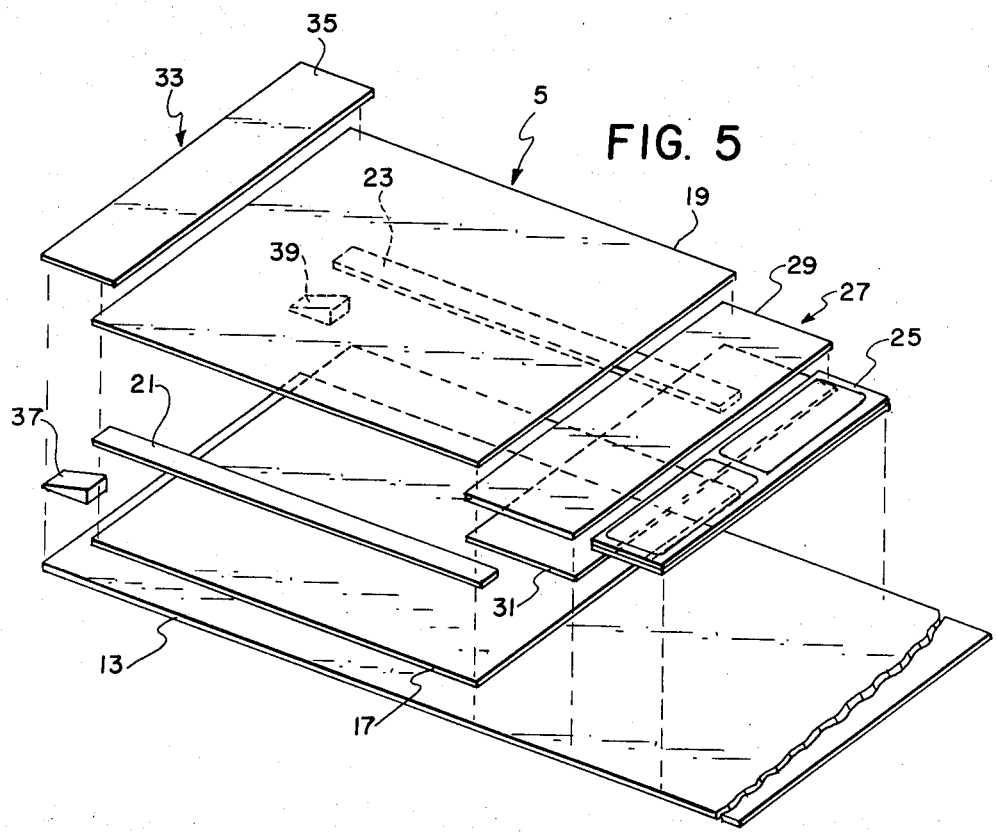

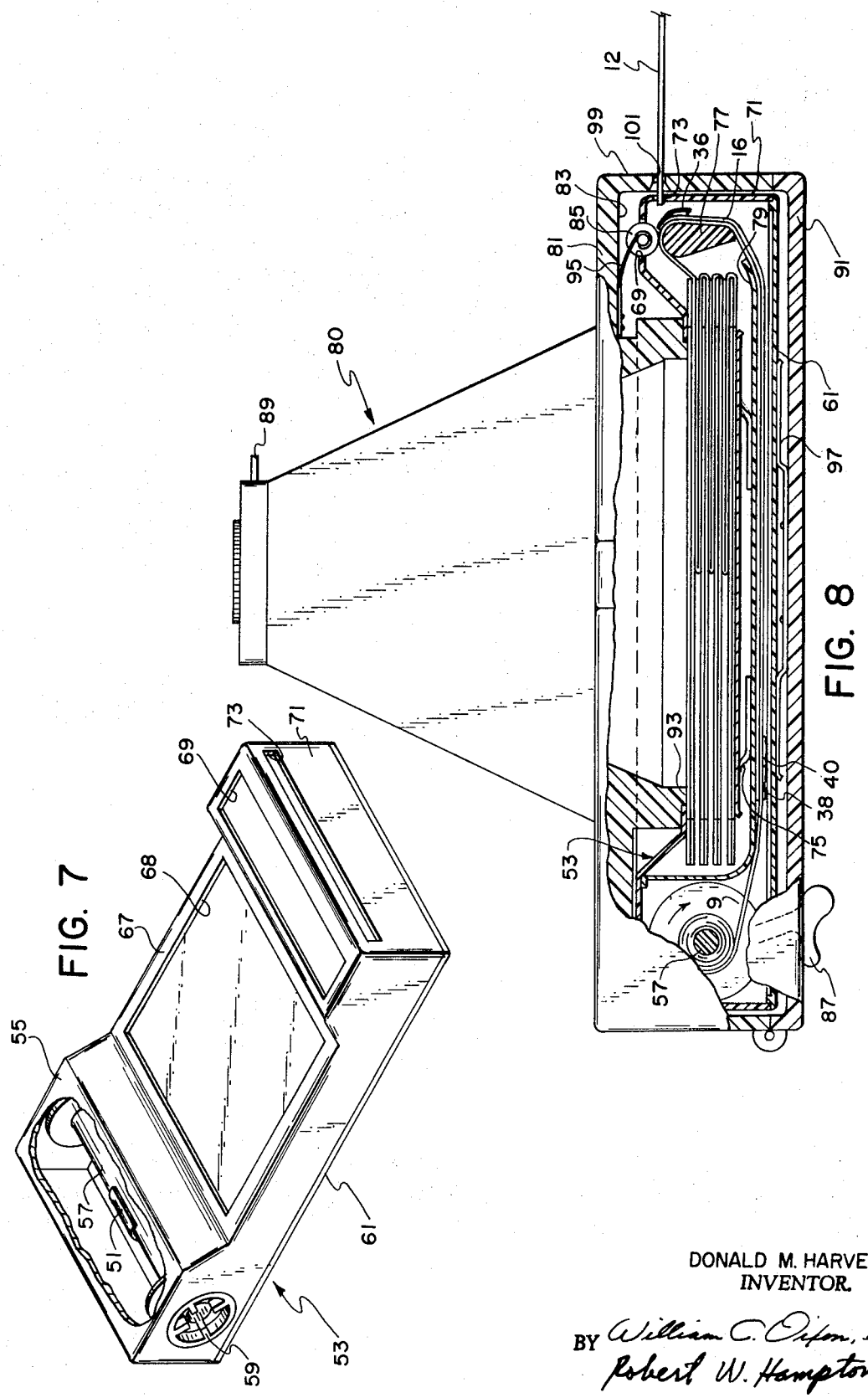

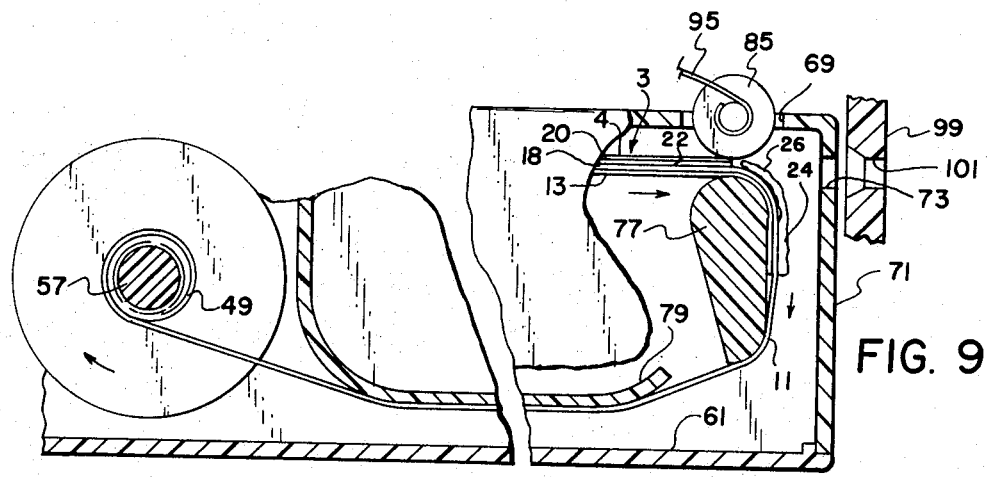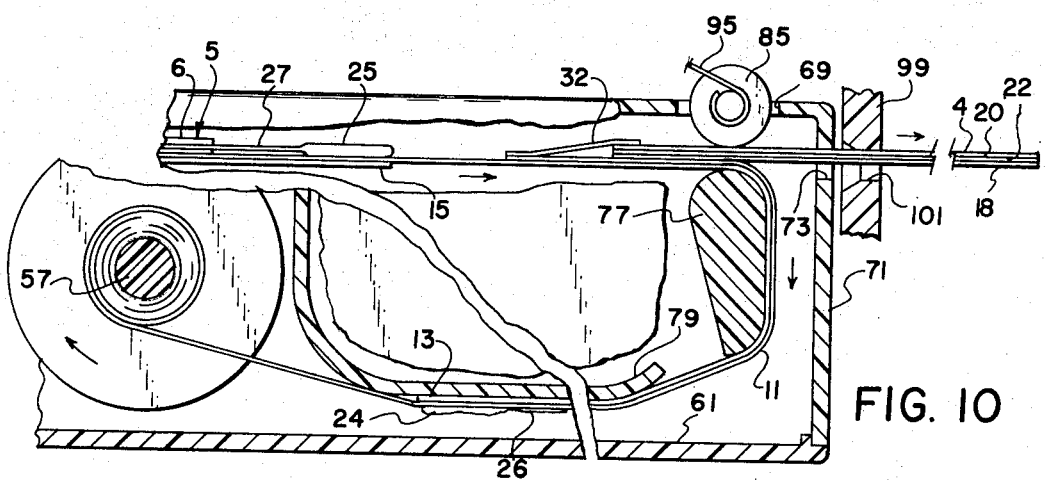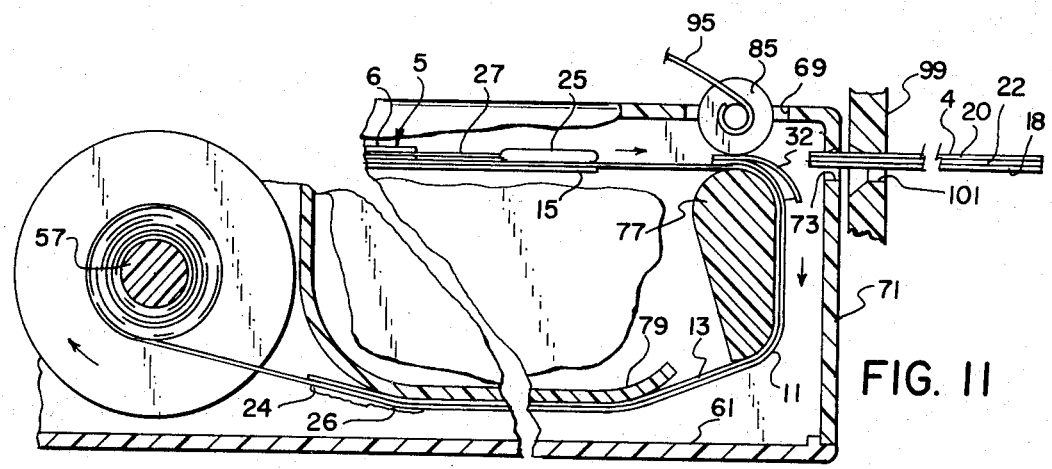

PHOTOGRAPHIC APPARATUS

BACKGROUND OF THE INVENTION

1. Field of the Invention

This invention relates generally to photographic apparatus for use with film units of the self-processing type, and particularly to such apparatus for use with improved assemblages of integral self-processing film units comprising a photosensitive element and a process sheet or second element permanently secured in overlying relationship to the photosensitive element.

2. Description of the Prior Art

In commonly assigned, copending U.S. Patent Application Ser. No. 033,677, entitled PHOTOGRAPHIC APPARATUS and filed May 1, 1970 in the name of Donald M. Harvey, are shown a camera and cartridge adapted for use with an improved film-unit assemblage of the type referred to above. The camera there disclosed comprises a chamber for receiving a cartridge loaded with a film-unit assemblage and, at one end of the camera, a pair of pressure-applying members between which a unit-transporting web in the assemblage passes to commence processing of the film units. At the same end of the camera is an exit opening through which portions of the film units that are separable from the unit-transporting web can pass after the web and units have passed between the pressure-applying members. Near the exit opening is disposed a web take-up spool rotatably mounted on the cartridge for receiving and storing the web and processing waste materials as the above-mentioned portions of the film units have been separated from the web and passed through the exit opening. One of the pressure-applying members is mounted on the camera body while the other is mounted on the camera door, so that, upon closing of the door, the two members are brought into juxtaposition for receiving the web and film units therebetween. Such a construction is relatively complex and requires careful control of tolerances in the manufacture of both the camera and the cartridge. Moreover, having the pressure-applying members, the exit opening, and the web take-up spool all disposed at the same end of the camera results in an asymmetrical camera design which may render such a camera inconvenient to use and unpleasing to behold. An improved camera and cartridge for use with a film-unit assemblage of the above-mentioned type and not having these disadvantages is believed highly desirable.

SUMMARY OF THE INVENTION

Accordingly, an object of the present invention is to provide, for use with an assemblage of self-processing film units interconnected by a unit-transporting web, improved photographic apparatus having means for receiving and storing the unit-transporting web and processing waste materials thereon after desired portions of the film units have been separated from the web and ejected from the apparatus, the improved apparatus to be more symmetrical than known apparatus of this type to facilitate use of the apparatus and enhance its appearance. Another object of the invention is to provide such improved apparatus that is less complex and less costly to manufacture than known apparatus of this type. A further object of the invention is to provide such improved apparatus that facilitates separation of the desired portions of the film units from the unit-transporting web and processing waste materials.

To meet these and other objects, the present invention provides improved photographic apparatus for use with an assemblage of film units having a pair of preregistered, superposed sheets separably coupled to a unit-transporting web, the apparatus comprising housing means defining a chamber for containing the assemblage and an aperture for exposing each film unit, the housing means including a first end portion defining an exit opening through which the pair of preregistered sheets of each film unit is transportable from the chamber and a second end portion, opposite to the first end portion, defining means for receiving the web from the chamber. The apparatus further comprises means for moving the web from the chamber to the receiving means, means for guiding the pair of preregistered sheets of each film unit along a substantially straight path from the chamber as the film unit is transported by the web, and means for guiding the web along an arcuate path divergent from the straight path, thereby separating the pair of preregistered sheets of the film unit from the web as the web is moved by the moving means.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 1 is a partial perspective view of an unfolded assemblage of self-processing film units with which the cooperating photographic apparatus of the present invention can be used;

FIG. 2 is a sectional view of one of the film units in the assemblage of FIG. 1 attached to its interconnecting leader;

FIG. 3 is a sectional view of the film unit of FIG. 2 with its interconnecting leader folded as in a stack of such units;

FIG. 4 is a perspective view of the film unit and folded leader of FIG. 3;

FIG. 5 is an exploded partial perspective view of the film unit and leader of FIG. 2;

FIG. 7 is a perspective view of the cartridge of FIG. 6 fully assembled, with a portion thereof broken away to show the enclosed web winding and storage device;

FIG. 8 is a side-elevation view, partially broken away for clarity of illustration, of a camera having therein the cartridge of FIGS. 6 and 7;

FIG. 9 is an enlarged sectional view of a portion of the camera of FIG. 8, showing the unit-transporting web and the pair of sheets of one of the film units thereon as that pair of sheets is about to be expelled from the camera;

FIG. 10 is an enlarged sectional view similar to FIG. 9, showing the web and pair of sheets as the pair of sheets is being expelled from the camera; and FIG. 11 is an enlarged sectional view similar to FIGS. 9 and 10, showing the web and pair of sheets as the pair of sheets has been virtually expelled from the camera.

DESCRIPTION OF THE PREFERRED EMBODIMENT

Figure 6:
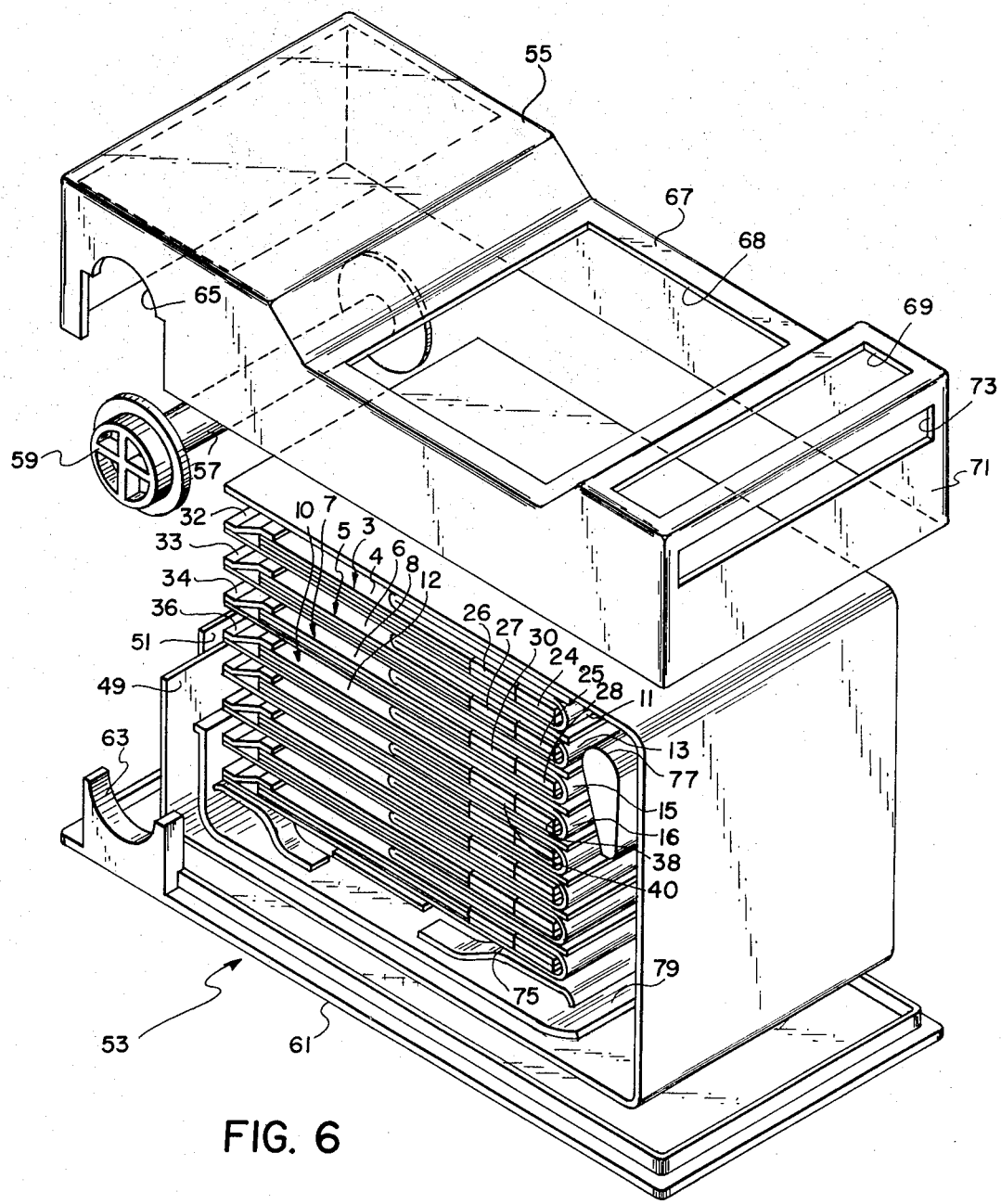
FIG. 6 is an exploded perspective view, exaggerated for clarity of illustration, of a cartridge according to the present invention containing the assemblage of FIG. 1 with its film units stacked in superposed relationship.

Because certain aspects of photographic apparatus are well known, the following description is directed in particular to those elements forming, or cooperating directly with, the present invention, elements that are not specifically shown or described herein being understood to be selectable from those known in the art.

FIGS. 1 through 11 of the drawings illustrate the preferred embodiment of photographic apparatus according to the present invention and an assemblage of self-processing film units adapted for use therewith. Various embodiments of such an assemblage are disclosed in commonly assigned, copending U.S. Patent Application Ser. No. 77,512, entitled PHOTOGRAPHIC FILM-UNIT ASSEMBLAGE and filed concurrently with this application in the name of Donald M. Harvey. In FIG. 1 is shown part of a film unit assemblage 1 which comprises a plurality of self-processing film units 3, 5, 7 and a unit-transporting web 9 including a plurality of interconnected leaders 11, 13, 15, 16. Film units 3, 5, 7 are of the type described in the aforementioned copending U.S. Patent Application Ser. No. 033,677. Film unit 5 and leader 13 are illustrated in FIGS. 2 through 5 as exemplary of other such units and leaders in the assemblage. Each unit includes a composite structure having a first layer of photo-sensitive material for establishing a developable latent image of a subject to which the photosensitive material is adapted to be exposed, a second layer of image-recording material, or mordent, for recording a visible image in response to development of the latent image, means for permanently maintaining the first and second layers in superposed relationship, and means for supplying to the layers a processing fluid adapted to effect development of the latent images and recording of the visible image. Preferably, both the first, or photosensitive, layer and the second, or image-recording, layer are supported in a single first sheet 17, a second sheet 19 being preregistered with first sheet 17 to control the spreading of the processing fluid over the two layers. First sheet 17 and second sheet 19 preferably remain registered as a unitized pair of sheets both before exposure and after processing, but the two sheets conceivably could be supplied in a separated relationship and then permanently re-gistered after exposure. As shown more clearly in FIG. 5, the film unit further comprises a pair of parallel spacing members 21, 23 disposed along the longitudinal edges of, and between, sheets 17 and 19 to define a predetermined distance between sheets 17 and 19, at least during processing, and to confine the processing fluid to a layer of predetermined thickness between said edges.

With reference to film unit 5, illustrated in FIGS. 1 through 5, the supplying means of the unit includes a rupturable pod 25 containing the processing fluid and means for directing the fluid from the pod, when ruptured, between sheets 17 and 19 for distribution over the aforementioned first and second layers. Rupturable pod 25 is defined generally by one or more sheets of fluid-impervious material which are securely sealed around three edges to define a fluid container and which include a rupturable seal along the fourth edge for discharging the fluid from the pod. The means for directing the fluid from the pod to the first and second layers comprises a funnel 27 made up of a pair of superposed, fluid-impervious sheets 29, 31 interposed between pod 25 and sheets 17, 19 in the manner shown in FIG. 5. It will be noted that pod 25 and funnel 27 are disposed at one end of sheets 17, 19. At the opposite end is a trap 33 for receiving and retaining any excess portion of processing fluid after the fluid has been distributed between sheets 17 and 19. Trap 33 comprises a skirt 35 that overlies sheet 19 and a pair of spacers 37, 39 that confine the excess processing solution between the ends of skirt 35. Pod 25 and trap 33 are securely adhered, or inseparably coupled, to leader 13, while the preregistered pair of sheets 17, 19 is strippably attached, or separably coupled, to leader 13 in a manner permitting separation of the pair of sheets from the leader 13 by pulling leader 13 in a direction divergent from the direction of travel of the sheets. To make sheets 17, 19 readily separable from the pod 25, funnel 27, and trap 33, the edges of sheets 29, 31 of funnel 27 are inserted between, but are not secured to, sheets 17 and 19. Similarly, skirt 35 of trap 33 overlies, but is not secured to, sheet 19. Thus, a leader 13 is pulled away from sheets 17, 19, the funnel will simply slide out from between sheets 17 and 19, and skirt 35 will simply slide off sheet 19.

Referring once again to FIG. 1, it will be seen that leaders 11, 13, 15, and 16 are interconnected in an overlapping or shingled relationship to form the unit-transporting web 9 to which film units 3, 5, 7 are attached in the manner described above. Taking film unit 5 as exemplary of all film units in the assemblage, film unit 5 has a first or leading end 41 and a second or trailing end 43 defining the overall length L of the unit. Similarly, taking leader 13 as exemplary of all leaders forming web 9, leader 13 has a first or leading end 45 and a second or trailing end 47 defining the overall length of the leader, which, as shown in FIG. 2, is equal to 2L + S. Thus, film unit 5 is disposed in such superposed relationship to leader 13 that second end 43 of film unit 5 coincides with second end 47 of leader 13, and the leading end of film unit 3 coincides with first end 45 of leader 13, thereby leaving the relatively small amount of space S between first end 41 of film unit 5 and the trailing end of film unit 3. Because sheets 17 and 19 of film unit 5 are permanently maintained in their preregistered, superposed relationship, only sheet 17 need be strippably attached to leader 13. Pod 25 of film unit 5 is securely attached, or inseparably coupled, to leader 13 at a first location on leader 13 between first end 45 and second end 47, which location is substantially coincident with the leading end of leader 15. First end 45 of leader 13 is securely attached, or inseparably coupled, to leader 11 at a second location along the length of leader 11 which is between the leading and trailing ends of leader 11 and which, as pointed out above, is substantially coincident with the leading end of film unit 3. In like manner, the leading end of leader 15 is securely attached, or inseparably coupled, to leader 13 at a location on leader 13 which is substantially coincident with first end 41 of film unit 5. Similarly, the leading end of leader 16 is connected to leader 15 at a location substantially coincident with the leading end of film unit 7. In manufacturing assemblage 1, the individual leaders can first be appropriately coupled to form web 9, and the film units can thus be appropriately coupled to respective leaders along the web. Alternatively, each film unit and its leader can be appropriately coupled to form a subassembly such as that illustrated in FIG. 2, and such subassemblies can then be assembled to form the entire assemblage. FIG. 2 illustrates a subassembly comprising film unit 5 and leader 13 unfolded to show the length relationship mentioned above. FIG. 3 illustrates the same subassembly with leader 13 folded over the leading half of film unit 5 as when assemblage 1 is arranged with its film units stacked in superposed relationship. FIG. 4 is a perspective view of the subassembly of FIG 3.

While, for purposes of illustration, FIG. 1 shows only a three-unit portion of assemblage 1, the assemblage in its entirety comprises a greater number of film units such as the eight units shown stacked in the cooperating apparatus of FIG. 6. Film units 3, 5, 7 of FIG. 1 are shown as the three upper-most units in the stack of units illustrated in FIG. 6. As may be seen in both FIGS. 3 and 6, when the units are stacked in superposed relationship, each leader is folded upwardly and around the leading end of its film units and extends rearwardly toward the trailing end of the unit to a point midway between the leading end and the trailing end of the unit, at which point the leader is then folded again and brought back upon itself toward the leading end of the unit so that the leading end of the leader then coincides with the leading end of the unit. The leading end of the leader, it will be remembered, is securely attached to the leader proceeding it at a point coinciding with the leading end of the film unit supported by the preceeding leader. The forwardmost or leading portion 49 of unit-transporting web 9 includes an adhesive element 51 for connecting web 9 to a storage device to be described more fully hereinafter in connection with the cooperating apparatus. Leading portion 49 is opaque to light actinic to the film units and extends across the uppermost film unit 3 to provide a dark cover for preventing premature exposure and for otherwise protecting the film units when contained in cooperating apparatus such as the cartridge 53 illustrated in FIGS. 6 and 7. A trailing portion of web 9 also may be folded beneath the lowermost film unit in the stack to protect that unit against scratching or other damage by the cartridge itself or by some foreign material that accidentally might enter the cartridge.

The cartridge 53 includes a disposable housing 53 that defines a supply chamber or compartment adapted to receive an assemblage of stacked film units and a rectangular opening 68 through which the units can be exposed. Cartridge 53 supports a web transporting and storage device such as spool 57 having a clutch 59 adapted to cooperate with a camera winding mechanism to effect movement of the unit-transporting web and its attached film units within the cartridge. Supporting housing 55 is a bottom wall member 61 having a pair of semicircular bearing surfaces 63 (only one of which is visible in FIG. 6) for rotatably supporting spool 57 between surfaces 63 and a pair of complementing semicircular surfaces 65 (only one of which is visible in FIG. 6) in housing 55. In order to permit appropriate alignment between cartridge 53 and a camera receiving the cartridge, housing 55 includes an aligning and light-sealing surface 67 surrounding opening 68 and adapted to mate with a corresponding surface of the camera to locate properly the uppermost film unit 3 in a focal plane defined by the camera objective. Housing 55 is also provided with a rectangular opening 69 adapted to receive a pressure-applying member of the camera in a manner to be described more fully hereinafter. Near opening 69 but in the end wall 71 of housing 55 is another rectangular opening 73, through which opening the preregistered first and second sheets of each film unit are adapted to be expelled from the cartridge. Bottom wall member 61 further supports a platen 75 adapted to urge resiliently each of the film units in the assemblage toward its uppermost position for proper alignment in the focal plane. Supported within cartridge 53 is a pressure-bearing and web-guiding member 77, the upper surface of which is disposed for alignment with the aforementioned pressure-applying member of the camera when the cartridge is received in the camera. It should be noted at this juncture that exit opening 73 and member 77 are both located in one end portion of cartridge 53, and that spool 57 is located in the opposite end portion of the cartridge. While FIG. 6 is an exploded view of cartridge 53 exaggerated for clarity of illustration, FIG. 7 shows cartridge 53 as it appears fully assembled with a portion of the topmost wall of casing 55 broken away to better illustrate how spool 57 is supported and enclosed by the cartridge. In cartridge 53 there is provided an interior wall member 79 adapted to define a passageway between platen 75 and bottom wall member 61, through which passageway the unit-transporting web is movable from member 77 to spool 57, as will be explained more fully below.

A camera adapted to receive a cartridge of the type illustrated in FIGS. 6 and 7 is shown in FIG. 8. The camera designated generally by the numeral 80, comprises a housing 81 defining a cartridge-receiving chamber 83 and supporting various camera components including a pressure applying member 85, a web-advancing member 87, a shutter-operating member 89, and a closure or cover door 91. The cartridge 53 is inserted into camera 80 by opening cover door 91, placing the cartridge into receiving chamber 83, and then closing door 91. This effects seating of cartridge 53 against a light seal 93 in the camera and positioning of pressure-applying member 85 partially into the cartridge through opening 69 in alignment with pressure-bearing and web-guiding member 77. Because pressure-applying member 85 is biased downwardly by its mounting spring 95, member 85 bears directly against the portion of the film assemblage that lies between members 77 and 85, as shown in FIG. 8. When cover door 91 is in its closed position, a spring member 97 thereon urges cartridge 53 forwardly into its operative position shown. In the right end wall 99 of housing 81 is an exit slot 101 in alignment with exit opening 73 of the cartridge, thereby providing a path of travel along which the preregistered first and second sheets of each film unit in the assemblage can pass out of the cartridge and camera. While the preregistered sheets of each film unit travel in a substantially straight line after passing between pressure members 77 and 85, the unit-transporting web is directed by member 77 downward, and thus away from that straight line, to effect separation of the web from the sheets. In FIG. 8, the pairs of preregistered sheets 4, 6, 8 of film units 3, 5, 7, respectively, of the assemblage 1 have already been expelled from the camera, and the pair of sheets 12 of film unit 10 is virtually expelled from the camera with its trailing end portion still in exit openings 73 and 101, leaving the last four film units of the assemblage in the cartridge. Unit-transporting web 9 is shown partially wound on spool 57, and trap 36 of film unit 10 is shown on web 9 to the right of pressure-applying member 85.

Referring now to the operation of assemblage 1 in cartridge 53 in camera 80, FIGS. 9, 10, and 11 are enlarged partial sectional views of camera 80 having in its receiving chamber 83 the cartridge 53 containing film assemblage 1. In FIG. 9, leading portion 49 of web 9 is shown wrapped around spool 57, which has been rotated in response to the camera operator's manipulation of web-advancing member 87. This, of course, would normally occur only after film unit 3 has been exposed in response to the operator's manipulation of shutter-operating member 89. In FIG. 9, web 9 has been wound on spool 57 just enough to pull film unit 3 into the bite of pressure members 77 and 85. Because the web is pulled downwardly around pressure-bearing and web-guiding member 77, leader 11 and the attached pod 24 and funnel 26 are directed along a path divergent from the path of travel of the preregistered pair of sheets 4, thereby effecting separation of the leader, pod, and funnel from the sheets. At this stage of the operation, pod 24 has been ruptured by its passage between pressure members 77 and 85 to initiate spreading of the processing fluid between preregistered sheets 18 and 20. FIG. 10 illustrates a stage of the operation reached after further winding of web 9 on spool 57 in response to continue manipulation of member 87. At this stage, leader 11 is partially wound on spool 57 and has pulled almost all of film unit 3 through the bite of pressure members 77 and 85. Because the preregistered pair of sheets 4 is relatively stiff as compared with the relatively flexible web, the sheets follow the aforementioned substantially straight-line path through exit openings 73 and 101, as shown. The continued divergence of movement of the sheets and the web thus causes their continued separation. FIG. 11 illustrates a still later stage of the operation reached when further winding of web 9 on spool 57 has caused the preregistered pair of sheets 4 to be virtually expelled from both the cartridge and the camera, leaving only the trailing end portion of the sheets in the exit openings and the trailing end portion of leader 11 and trap 32 between the pressure members. During passage of film unit 3 between the pressure members, the processing fluid supplied by pod 24 and funnel 26 is spread between the sheets 18 and 20, any excess portion of the fluid being received and retained by trap 32. The preregistered pair of sheets 4 can now be exposed to ambient illumination and be handled by the camera operator, even though development of the latent image and recording of the visible image may not have been completed, because the opacifying agent in the processing fluid between sheets 18 and 20 protects the photosensitive layer in sheet 18 from exposure to such illumination and because the processing is self-timed to produce a right-reading positive print without further attention on the part of the operator.

As shown in FIGS. 10 and 11, film unit 5 follows closely behind film unit 3, the linear space between the two units being the small amount S illustrated in FIGS. 1, 2, and 3. Because of the small space between succeeding film units, relatively little web winding on spool 57 is needed in order to effect the necessary movement of the film units through the bite of pressure members 77 and 85, so that the time required for such movement, the diameter of the web winding on the spool, the space needed in the cartridge for the winding, and hence the size of both the cartridge and the camera, can all be less than would be necessary with an assemblage having a greater space between succeeding film units.

It will be seen that the aforementioned objects of the present invention are thus achieved by the provision of improved photographic apparatus adapted for use with an assemblage of self-processing film units interconnected by a unit-transporting web. The apparatus of the present invention is more symetrical than similar apparatus known heretofore, thereby rendering the apparatus more convenient to use and more pleasing in appearance; the apparatus is less complex and less costly to manufacture; and the apparatus more readily separates desired portions of the film units from the web so that such portions can be expelled from the apparatus while the web and remaining portions are received by a waste storage device in the apparatus.

The invention has been described in detail with particular reference to the preferred embodiment thereof, but it will be understood that variations and modifications can be effected within the spirit and scope of the invention.

I claim:

1. A disposable cartridge for containing an assemblage of self-processing film units interconnected by a relatively flexible unitstransporting web having a leading end, each film unit including a pair of preregistered, permanently coupled, relatively stiff sheets separably attached to the web, each pair of sheets being separable from the web in response to a divergent relative movement therebetween, the web being movable within said cartridge to transport each pair of sheets within and from said cartridge, said cartridge comprising:

means, defining a substantially closed chamber and having first and second end portions, for containing the assemblage of film units, said containing means including elongate side walls supporting a rotatable take-up spool in said first end portion, said spool including means for receiving the leading end of the web to facilitate winding the web thereon upon rotation of said spool;

means, defining an exit opening in said second end portion, for permitting egress of each pair of sheets from said chamber; and means for guiding the web along a path defining a sharp bend between said exit opening and said spool to effect the divergent relative movement between each pair of sheets and the web, separation of each pair of sheets from the web, and transport of each pair of sheets from said chamber in response to winding the web on said spool.

2. The cartridge claimed in claim 1 in combination with said assemblage of film units.

3. The cartridge claimed in claim 1 wherein said first and second end portions are substantially opposite to each other.

4. The cartridge claimed in claim 1 wherein said guiding means includes a pressure member surface over which the web moves before reaching said sharp bend as the web is wound on said spool.

5. In photographic apparatus, a housing having first and second opposite end portions and defining a chamber for containing a stack of self-processing film units interconnected by a relatively flexible unit-transporting web means, each film unit including a pair of preregistered, permanently coupled, relatively stiff sheets separably attached to the web means, each pair of sheets being separable from the web means in response to a divergent relative movement therebetween, the web means being movable within said housing to transport each pair of sheets within and from said housing, said housing comprising:

means in the first of said end portions defining an exit slot for permitting egress of each pair of sheets from said housing;

means adjacent to said exit slot for directing the web means in a sharply curved path to effect the divergent relative movement between each pair of sheets and the web means, and consequent separation of each pair of sheets from the web means, upon movement of the web means within said housing; and means in the second of said end portions for receiving the web means from said directing means.

6. The housing claimed in claim 5 in combination with said stack of film units interconnected by the unit-transporting web means.

7. The housing claimed in claim 5 wherein said means for directing the web means includes a pressure member surface over which the web means moves before reaching the sharply curved path upon movement of the web means within said housing.

8. The housing claimed in claim 5 wherein said means for receiving the web means includes a takeup spool adapted to receive the web means thereon in winding relationship.

9. In photographic apparatus, the combination comprising:

a housing defining an exposure aperture and a chamber for containing behind said aperture a stack of self-processing film units interconnected by a relatively flexible unit-transporting web means having a leading end, each film unit including a pair of preregistered, superposed, permanently coupled, relatively stiff sheets removably adhered to the web means, each pair of sheets being removable from the web means in response to a divergent relative movement therebetween, the web means being movable within said housing to transport each pair of sheets within and from said housing, said housing including a first end portion defining an exit opening through which each pair of sheets is transportable by the web means from said chamber and a second end portion, opposite to said first end portion, defining means for receiving the web means from said chamber;

means for guiding each pair of sheets along a substantially straight path as that pair of sheets is transported by the web means from said chamber;

means for moving the web means from said chamber to said receiving means; and means for guiding the web means along a sharply curved path to effect the divergent relative movement between each pair of sheets and the web means, and consequent separation of that pair of sheets from the web means, as the web means is moved by the moving means.

10. The combination claimed in claim 9 in combination with said stack of film units interconnected by the unit-transporting web means.

11. The combination claimed in claim 9 wherein said means for receiving the web means includes a rotatably take-up spool adapted to receive the leading end of the web means and to wind the web means thereon as said spool is rotated.

12. The combination claimed in claim 11 wherein said means for moving the web means includes means coupled to said take-up spool for imparting rotation thereto.

13. The combination claimed in claim 9 wherein said means for guiding the web means includes a pressure member surface over which the web means moves before reaching said sharply curved path.

14. Photographic apparatus for use with a film unit including an integral pair of preregistered, superposed, permanently coupled sheets removably adhered to a unit-transporting web, the pair of sheets being removable from the web in response to divergent relative movement therebetween, the web being movable within said apparatus to transport the pair of sheets within and from said apparatus, said apparatus comprising:

a housing defining a chamber for containing the film unit and an aperture for exposing the film unit, said housing including a first end portion defining an exit slot through which the pair of sheets is transportable by the web from said chamber and a second end portion, opposite to said first end portion, defining means for receiving the web from said chamber;

means for moving the web from said chamber to said receiving means;

means for guiding the pair of sheets along a substantially straight path from said chamber as the pair of sheets is transported by the web; and means for guiding the web along an arcuate path divergent from said straight path to effect removal of the pair of sheets from the web as the web is moved by said moving means.

15. The apparatus claimed in claim 14 in combination with said film unit including the integral pair of sheets removably adhered to the unit-transporting web.

16. The apparatus claimed in claim 14 wherein said receiving means includes a take-up spool adapted to receive the web thereon in winding relationship.

17. The apparatus claimed in claim 14 wherein said means for guiding the web includes a pressure member surface over which the web moves before reaching said arcuate path.

18. A disposable cartridge, adapted to contain an assemblage of self-processing film units interconnected by an elongate, relatively flexible, unit-transporting web movable within said cartridge, each film unit including a pair of preregistered, permanently coupled, relatively stiff, substantially flat sheets separably attached to the web, each pair of sheets being separable from the web in response to a divergent relative movement therebetween, said cartridge being adapted for use in a self-processing camera having means for receiving said cartridge, means for applying pressure at a predetermined location in said cartridge, and means operable for effecting movement of the web to transport each pair of sheets within and from said cartridge, said cartridge comprising:
- a central portion having means defining a chamber for containing the assemblage of film units interconnected by the web;
- a first end portion having means defining an opening through which each pair of sheets is transportable from said cartridge along a first path as the web is moved within said cartridge in response to operation of the movement effecting means of the camera;
- means near said first end portion for guiding the web along a second path divergent from said first path to effect separation of each pair of sheets from the web as that pair of sheets is transported along said first path; and
- a second end portion, opposite to said first end portion, having means for receiving the web from said second path.

19. The cartridge claimed in claim 18 wherein said means for guiding the web includes a surface adjacent to said predetermined location for supporting the web and each film unit against pressure applied at said location by the pressure applying means of the camera.

20. The cartridge claimed in claim 18 wherein said means for receiving the web includes a rotatable take-up spool couplable to the web and engageable with the movement effecting means of the camera so as to wind the web thereon as the movement effecting means is operated.

21. The cartridge claimed in claim 18 in combination with said assemblage of film units interconnected by the web.

22. The cartridge claimed in claim 21 in further combination with said self-processing camera.

* * * * *

PO-1050
(5/69)

UNITED STATES PATENT OFFICE
CERTIFICATE OF CORRECTION

Patent No. __3,673,939__    Dated __July 4, 1972__

Inventor(x) __Donald M. Harvey__

It is certified that error appears in the above-identified patent and that said Letters Patent are hereby corrected as shown below:

(Because some line numbers in the patent are not correctly registered with the lines referred to, all line numbers cited below are by actual count from the top of each column.)

In the Abstract, line 3, change "with" to --within--. In Col. 1, after "PHOTOGRAPHIC APPARATUS" insert the following:
   --CROSS-REFERENCES TO RELATED APPLICATIONS
   Reference is made to commonly assigned, copending U.S. Patent Application Serial No. 033,677, entitled PHOTOGRAPHIC APPARATUS and filed May 1, 1970 in the name of Donald M. Harvey.
   Reference is made to commonly assigned, copending U.S. Patent Application Serial No. 077,512, entitled PHOTOGRAPHIC FILM-UNIT ASSEMBLAGE and filed on even date herewith in the name of Donald M. Harvey.
   Reference is made to commonly assigned, copending U.S. Patent Application Serial No. 077,473, entitled PHOTOGRAPHIC FILM-UNIT ASSEMBLAGE and filed on even date herewith in the name of Joseph D. Guite, Sr.--.
In Col. 3, line 52, after "Thus," change "a" to --as--; lines 66 and 67, delete "Thus, film" and insert --Film--. In Col. 4, line 44, change "proceeding" to --preceding--; line 59, change "53" (second occurrence) to --55--. In Col. 7, line 3, change "unitstransporting" to --unit-transporting--.

Signed and sealed this 9th day of January 1973.

(SEAL)
Attest:

EDWARD M.FLETCHER,JR.
Attesting Officer

ROBERT GOTTSCHALK
Commissioner of Patents